United States Patent
Jabcon et al.

(10) Patent No.: US 10,131,192 B2
(45) Date of Patent: Nov. 20, 2018

(54) CENTRAL TIRE INFLATION/DEFLATION SYSTEM WITH A TIMED FUNCTION CTIS WHEEL VALVE

(71) Applicant: Parker-Hannifin Corporation, Cleveland, OH (US)

(72) Inventors: Leonard Joseph Jabcon, Kalamazoo, MI (US); Robert Brian Knepple, Kalamazoo, MI (US); James Alden Beverly, Kalamazoo, MI (US); Stephen P. Claussen, Richland, MI (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 15/514,105

(22) PCT Filed: Sep. 28, 2015

(86) PCT No.: PCT/US2015/052713
§ 371 (c)(1),
(2) Date: Mar. 24, 2017

(87) PCT Pub. No.: WO2016/049652
PCT Pub. Date: Mar. 31, 2016

(65) Prior Publication Data
US 2017/0299077 A1    Oct. 19, 2017

Related U.S. Application Data

(60) Provisional application No. 62/056,207, filed on Sep. 26, 2014.

(51) Int. Cl.
*B60C 23/00* (2006.01)
*F16K 21/06* (2006.01)

(52) U.S. Cl.
CPC ............ *B60C 23/003* (2013.01); *F16K 21/06* (2013.01)

(58) Field of Classification Search
CPC ..... B60C 23/00; B60C 23/001; B60C 23/003; F16K 21/06; F16K 21/12
See application file for complete search history.

(56) References Cited

U.S. PATENT DOCUMENTS 3,845,991 A    11/1974  Engle
4,708,184 A *  11/1987  Pechar ................. B60C 23/003
                                                              137/102

(Continued)

FOREIGN PATENT DOCUMENTS

JP    H01109109    4/1989

OTHER PUBLICATIONS

International Search Report and Written Opinion for corresponding International Patent Application No. PCT/US2015/052713 dated Dec. 21, 2015.

*Primary Examiner* — Kip T Kotter
(74) *Attorney, Agent, or Firm* — Renner, Otto, Boisselle & Sklar, LLP

(57) ABSTRACT

A central tire inflation/deflation system (CTIS) with a novel valve that may deflate more quickly and may deflate to a lower pressure than the previously known central tire inflation/deflation system valves. Also, the present valve may not be temperature sensitive, at least because the present valve does not require trapped air behind a diaphragm to operate the valve. The present valve may be placed into existing CTIS's in place of existing valves, without modifying pneumatic lines of the existing CTIS's. Thus, the present valve may be operated by a single fluid flow line, receive pressure from the single fluid flow line, and exhaust to the single fluid flow line. A second communication line, either a pneumatic pilot line or an electrical line, is not necessary, which allows (Continued)

the present valve to be retrofit into an existing CTIS without adding weight or complication from additional components.

20 Claims, 11 Drawing Sheets

(56) References Cited

U.S. PATENT DOCUMENTS

| | | | | |
|---|---|---|---|---|
| 4,765,385 | A * | 8/1988 | McGeachy | B60C 23/003 137/116.3 |
| 4,883,105 | A * | 11/1989 | Schultz | B60C 23/003 137/859 |
| 4,895,199 | A * | 1/1990 | Magnuson | B60C 23/003 137/102 |
| 4,986,299 | A * | 1/1991 | Schultz | B60C 23/001 137/269 |
| 5,309,969 | A * | 5/1994 | Mittal | B60C 23/003 137/224.5 |
| 5,540,268 | A | 7/1996 | Mittal | |
| 7,273,082 | B2 | 9/2007 | White et al. | |
| 9,415,645 | B2 * | 8/2016 | Racine | B60C 23/003 |
| 9,878,586 | B2 * | 1/2018 | Laanemets | B60C 23/004 |
| 2007/0204946 | A1 | 9/2007 | Medley et al. | |
| 2009/0090421 | A1 | 4/2009 | Foster et al. | |
| 2012/0059546 | A1 | 3/2012 | Wilson et al. | |
| 2013/0276902 | A1 | 10/2013 | Medley et al. | |
| 2015/0144222 | A1 * | 5/2015 | Wilson | B60C 23/003 141/66 |

* cited by examiner

CENTRAL TIRE INFLATION/DEFLATION SYSTEM WITH A TIMED FUNCTION CTIS WHEEL VALVE

RELATED APPLICATIONS

This application is a national phase of International Application No. PCT/US2015/052713 filed Sep. 28, 2015 and published in the English language, which claims the benefit of U.S. Provisional Application No. 62/056,207 filed Sep. 26, 2014, which are incorporated herein by reference.

FIELD OF INVENTION

The present invention relates generally to tire inflation systems, and more particularly to a fluid valve for central tire inflation/deflation systems.

BACKGROUND

A central tire inflation/deflation system (CTIS) is a system that may provide control over the air pressure in each tire of a vehicle as a way to improve performance on different surfaces. For example, lowering the air pressure in a tire creates a larger area of contact between the tire and the ground and makes driving on softer ground much easier. It also does less damage to the surface. This is important for certain work sites, such as agricultural fields.

Drivers of vehicles with a CTIS may directly control pressure in each tire to enhance mobility of the vehicle based on the terrain. Also, the CTIS may maintain a desired pressure to counteract leaks in each tire.

CTIS's typically include an air supply source in selective fluid communication with a tire via a pneumatic conduit. The pneumatic conduit may include a valve with a pressure-side port for allowing the air supply source to provide pressurize the tire and alternatively for allowing the tire to deflate. Typically, the pressure-side port fluidly connects to only a single fluid flow line. The single fluid flow line carries airflow from the pressure source to the valve and carries exhaust airflow from the tire via the pressure-side port of the valve.

Previous valves include a spring-loaded diaphragm to keep the valve in a closed state. In the closed state, a pressure chamber fluidly connected to the pressure-side port provides pressurized fluid from the air supply source, and a control orifice of the valve provides pressurized fluid from the tire to the diaphragm. The control orifice has significantly smaller cross-sectional area compared to pressure chamber to limit back pressure sensitivity of the diaphragm. Ideally, providing air pressure above a threshold value to the pressure-side port displaces the diaphragm to open the valve, and lowering the pressure at the pressure-side port below the pressure-side port immediately closes the valve to prevent fluid flow in or out of the associated tire.

SUMMARY OF INVENTION

The present invention provides a central tire inflation/deflation system (CTIS) with a novel valve that may deflate more quickly and may deflate to a lower pressure than the previously known central tire inflation/deflation system valves. Also, the present valve may not be temperature sensitive, at least because the present valve does not require trapped air behind a diaphragm to operate the valve. The present valve may be placed into existing CTIS's in place of existing valves, without modifying pneumatic lines of the existing CTIS's. Thus, the present valve may be operated by a single fluid flow line, receive pressure from the single fluid flow line, and exhaust to the single fluid flow line. A second communication line, either a pneumatic pilot line or an electrical line, is not necessary, which allows the present valve to be retrofit into an existing CTIS without adding weight or complication from additional components.

The present valve may include a valve member and a damper operably connected to the valve member to prevent immediate closure of the valve by dampening movement of the valve member to a closed position. Preventing immediate closure of the valve allows the valve to overcome several shortcomings of the above mentioned valve with a pressure sensitive diaphragm ("diaphragm valve").

The valve of the present application does not require a comparatively small control orifice, at least because the present valve is not sensitive to back pressure on the control side. Without a small control orifice, the fluid may flow more freely to allow the present valve to deflate or inflate more quickly than the diaphragm valve.

Once opened, the valve of the present application does not require a reference pressure from a pressure source to remain open for a prescribed period of time open. The pressure source may be completely fluidly disconnected from the present valve during the prescribed period of time open. Fluidly disconnecting the pressure source from the present valve allows the associated deflating tire to quickly deflate with reference to ambient pressure. By contrast, the previous the diaphragm valve requires a reference pressure above ambient pressure from a pressure source via the single fluid flow line. The reference pressure required for the diaphragm valve hinders deflation of the associated tire and prevents deflation of the associated tire below the reference pressure—such as to ambient pressure.

The present valve may include a first inlet/outlet port and a second inlet/outlet port to allow fluid to flow through the valve in either direction when open. The valve may include a reset member to shift the valve member to an open position when a reset pressure threshold is met at the first inlet/outlet port. The reset member may quickly return to an open position to transition the valve to an open state. Once the valve is in the open state, the damper may prevent immediate closure of the valve to allow the valve to remain open for a prescribed period of time, thereby allowing fluid to flow from either one of the ports to the other until the damper allows the valve member to close.

According to one aspect of the invention, a valve for use in an inflation/deflation system, particularly for use in a central tire inflation/deflation system, may include a valve body having a first inlet/outlet port fluidly connectable to a second inlet/outlet port, a valve member within the valve body for fluidly disconnecting the first inlet/outlet port and the second inlet/outlet port, the valve member being moveable from a first position to a second position, and a damper operably connected to the valve member to dampen movement of the valve member from the second position to the first position. Wherein in a first state the first inlet/outlet port is fluidly disconnected from the second inlet/outlet port by the valve member, wherein the valve would transition to a second state when a fluid pressure at the first inlet/outlet port is at or above a prescribed pressure threshold, when in the second state the first inlet/outlet port would be fluidly disconnected from the second inlet/outlet port and wherein the valve would transition to a third state from the second state when the fluid pressure is below the prescribed pressure threshold while the valve is in the second state, when in the third state the first inlet/outlet port would be fluidly connected to the second inlet/outlet port while the damper will dampen movement of the valve member from the second position to the first position to maintain the valve in the third state for a prescribed period of time.

The valve may further include the valve body forming a primary chamber, the primary chamber being fluidly connectable to the first inlet/outlet port and the second inlet/outlet port, the damper having a portion moveable from a first position to a second position by a first force, and moveable from the second position to the first position by a second force, wherein the first force is less than the second force, the valve member extending along a central axis, and moveable within the primary chamber, a timing resilient member biasing the valve member in a first axial direction to bias the valve member in the first position, a reset member moveable within the primary chamber to move the valve member from the first position to the second position, wherein when the valve member abuts the reset member the first inlet/outlet port and the second inlet/outlet port are fluidly disconnected, wherein in the first state, the valve member and the reset member abut one another within a first portion of the primary chamber to fluidly disconnect the first inlet/outlet port and the second inlet/outlet port, wherein in the second state, the valve member and the reset member abut one another within a second portion of the primary chamber, the second portion of the primary chamber being axially spaced in a second axial direction opposite the first axial direction from the first portion of the primary chamber, wherein in the third state, the valve member and the reset member are axially spaced from one another to allow fluid flow therebetween, thereby fluidly connecting the first inlet/outlet port and the second inlet/outlet port. A central tire inflation/deflation system may include the valve.

According to another aspect of the invention, a method of operating a valve for use in an inflation system, may include providing the valve, the valve including a valve body having a first inlet/outlet port fluidly connectable to a second inlet/outlet port, a valve member within the valve body for fluidly disconnecting the first inlet/outlet port and the second inlet/outlet port, the valve member being moveable from a first position to a second position, and a damper operably connected to the valve member to dampen movement of the valve member from the second position to the first position, wherein in a first state the first inlet/outlet port is fluidly disconnected from the second inlet/outlet port by the valve member, providing fluid with a fluid pressure at or above a prescribed pressure threshold at the first inlet/outlet port, transitioning the valve to a second state based on the fluid pressure being at or above the prescribed pressure threshold, wherein in the second state the first inlet/outlet port is fluidly disconnected from the second inlet/outlet port, reducing the fluid pressure below the prescribed pressure threshold at the first inlet/outlet port, and transitioning the valve to a third state based on the fluid pressure being below the prescribed pressure threshold, dampening movement of the valve member from the second position to the first position with the damper to maintain the valve in the third state for a prescribed period of time, wherein in the third state the first inlet/outlet port is fluidly connected to the second inlet/outlet port. The method may include operating a plurality of the valves.

The foregoing and other features of the invention are hereinafter described in greater detail with reference to the accompanying drawings.

DETAILED DESCRIPTION

The principles of this present application have particular application to central tire inflation/deflation system valves for allowing inflation and deflation of vehicle tires, and thus will be described below chiefly in this context. It will be appreciated that principles of this invention may be applicable to other fluid systems where it is desirable to reduce or increase pressure of a fluid in a reservoir. For example, the novel valve of the present invention may be utilized in a fluid system other than a CTIS.

Figure 1:
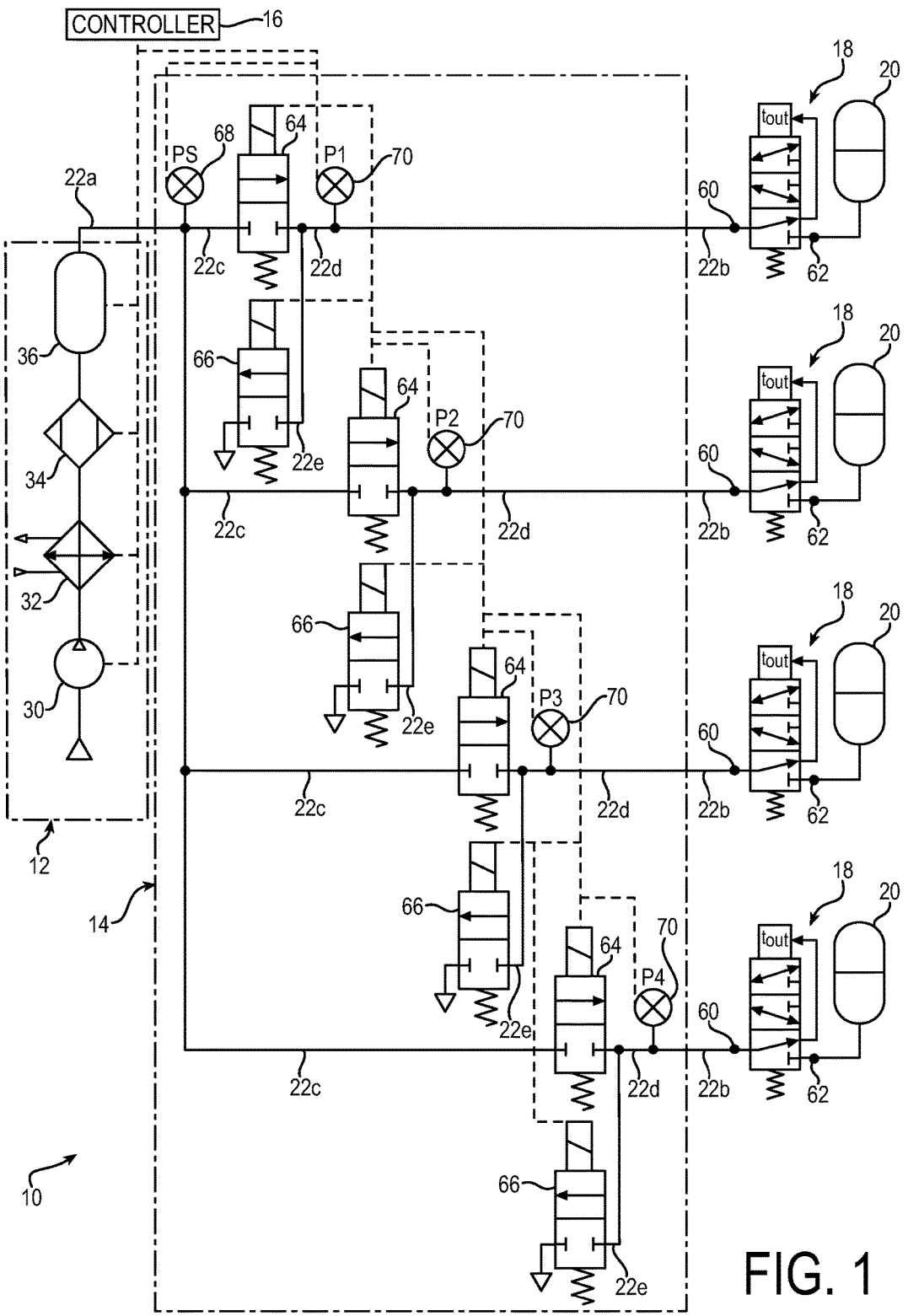
FIG. 1 is a schematic view of a central tire inflation/deflation system of a vehicle including a plurality of exemplary valves in a closed state fluidly disconnecting a control system from each of a plurality of vehicle tires.

Referring now in detail to the drawings, and initially to FIG. 1, a portion of a vehicle with a central tire inflation/deflation system 10 is illustrated schematically. The central tire inflation/deflation system 10 may include a pressure source 12, a control system 14, a controller 16 that may control the pressure source 12 and the control system 14, four of valves 18, four of fluid reservoirs, such as four vehicle tires 20, and one or more fluid flow lines 22a-22b.

The controller 16 may include a computer processor and a memory device to operate the pressure source 12 and the control system 14. Operation of the pressure source 12 and the control system 14 allows the controller 14 to control fluid flow from the pressure source 12 to operate each valve 18. Communication lines, illustrated as dashed lines, may operably connect the controller 16 to various components of the pressure source 12 and the control system 14 to allow operation of each valve 18. For example, the communication lines may allow electrical impulses to be communicated. In an embodiment, the communication lines are able to carry electrical signals to and from the controller. In another embodiment, the controller may bi-directionally communicate with components of the vehicle, for example to determine a speed of the vehicle.

The controller 16 may operate the pressure source 12 and the control system 14 to control each valve 18 to be in a closed state, a reset state (also known as an "initialized state"), or an open state. Each valve 18 may remain in the open state for a prescribed period of time to allow each corresponding vehicle tire 20 to be inflated or deflated.

The pressure source 12 may include a fluid pump 30, such as a pneumatic compressor, a cooler 32, an air dryer 34, and a system reservoir 36. The fluid pump 30 may include an intake port for receiving ambient fluid, such as ambient air, and may include an outlet fluidly connected to an inlet of the cooler 32. The cooler 32 may include an outlet fluidly connected to an inlet of the air dryer 34. The air dryer 34 may include an outlet fluidly connected to an inlet of the system reservoir 36.

The controller 16 may initiate the fluid pump 30 to suction ambient fluid, such as ambient air. If the ambient fluid is a compressible fluid, the fluid pump 30 may pressurize the fluid as the fluid pump 30 provides the fluid to the system reservoir 36 via the cooler 32 and the air dryer 34. For example, if the fluid pump 30 includes a compressor, the compressor may compress ambient air to provide pressurized air to the system reservoir 36 via the cooler 32 and the air dryer 34.

The fluid pump 30 may discharge pressurized fluid out of the outlet of the fluid pump 30 to provide the pressurized fluid to the inlet of the cooler 32. The cooler 32 may cool the pressurized fluid, which may cause the pressurized fluid to condense. For example, if the pressurized fluid is pressurized air, the pressurized air may condense which may cause the water in the pressurized air to condense.

The cooler 32 may discharge cooled pressurized air from the outlet of the cooler 32 to provide the cooled pressurized air to the inlet of the air dryer 34. The air dryer 34 may remove water molecules from the rest of the cooled pressurized air to prevent water from building up in the system reservoir 36, the control system 14, each valve 18, or each vehicle tire 20.

The air dryer 34 may discharge dried pressurized air out of the outlet of the air dyer 34 to provide the dried pressurized air to the inlet of the system reservoir 36. In an embodiment, the fluid pump may provide fluid directly to the system reservoir.

The system reservoir 36 may hold pressurized fluid until the controller 16 instructs the system reservoir 36 discharge the pressurized fluid from an outlet of the system reservoir 36 to provide the pressurized fluid to an inlet of the control system 14 for operating each valve 18 and/or for inflating the corresponding vehicle tire 20. For example, the system reservoir 36 may hold pressurized air and discharge the pressurized air to the inlet of the control system 14. In an embodiment, the fluid pump may provide fluid directly to the control system.

The system reservoir 36 may provide pressurized fluid to each vehicle tire 20 via the fluid flow line 22a when the control system 14 fluidly connects the system reservoir 36 to each valve 18 and the valve 18 is open.

Each valve 18 may include a first inlet/outlet port 60 fluidly connected to an outlet of the control system 14, and may include a second inlet/outlet port 62 fluidly connected to the corresponding vehicle tire 20 via a fluid flow line. In an embodiment, more than four valves are provided, for example, 6 or 8 valves may be provided. In another embodiment less than four valves are provided.

Figure 2:
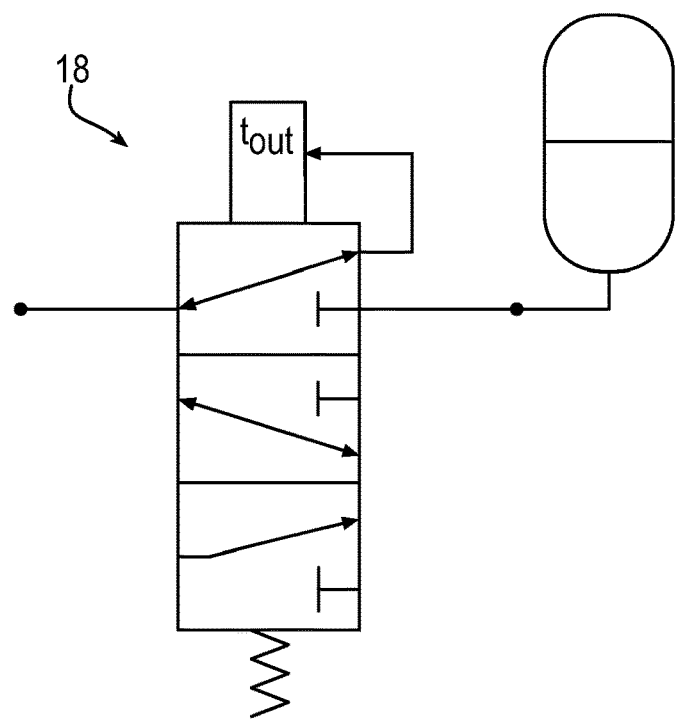
FIG. 2 is a schematic view of a portion of the central tire inflation/deflation system of FIG. 1 including the exemplary valve in a reset state fluidly disconnecting a first inlet/outlet port of the valve from a second inlet/outlet port of the valve.
Figure 3:
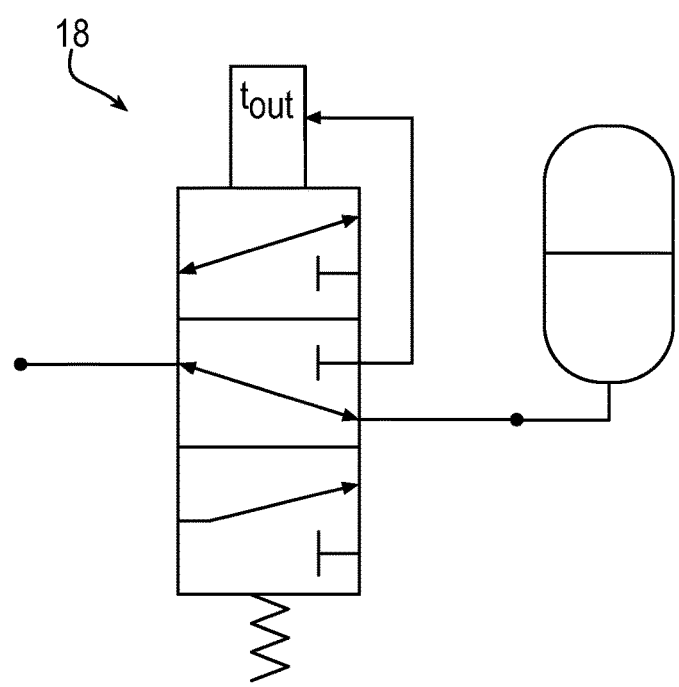
FIG. 3 is a schematic view of a portion of the central tire inflation/deflation system of FIG. 1 including the exemplary valve in an open state fluidly connecting the first inlet/outlet port of the valve to the second inlet/outlet port of the valve.

In the closed state, the valve 18 may be closed, thereby fluidly disconnecting the first inlet/outlet port 60 from the second inlet/outlet port 62. In the reset state (as shown in FIG. 2), the valve 18 may be closed. In the open state (as shown in FIG. 3), the valve 18 may be open, thereby fluidly connecting the first inlet/outlet port 60 to the second inlet/outlet port 62. As illustrated schematically, the valve 18 may remain in the open state for a prescribed period of time. While open, the valve 18 may allow the vehicle tire 20 to be inflated or to be deflated.

The control system 14 may include one or more fluid flow lines 22c-22e, four of supply valves 64, four of vent valves 66, a supply pressure sensor 68, and four of inflation/deflation pressure sensors 70. In another embodiment, the fluid flow lines of the control system may form at least a portion of the fluid flow lines of the central tire inflation/deflation system that fluidly connect the control system to the pressure source and to each valve. In another embodiment, the fluid flow lines of the central tire inflation/deflation system—that connect the control system to the pressure source and to each valve—may form at least a portion of the fluid flow lines of the control system.

Each fluid flow line 22c-22e may fluidly connect each supply valve 64 and each vent valve 66 to at least one of the pressure source 12 or to the valve 18. Each fluid flow line 22c may fluidly connect the inlet of the corresponding supply valve 64 to the outlet of the pressure source 12. For example, each fluid flow line 22c may fluidly connect to the fluid flow line 22a.

Each fluid flow line 22d may fluidly connect the outlet of the corresponding supply valve 64 to the first inlet/outlet port 60 of the corresponding valve 18. For example, each fluid flow line 22d may fluidly connect to the corresponding fluid flow line 22b. Fluidly connecting each supply valve 64 to the corresponding first inlet/outlet port 60 allows each supply valve 64 to provide pressurized fluid to the corresponding first inlet/outlet port 60 to control each valve 18.

Controlling each valve 18 to open allows the pressure source 12 to provide pressurized fluid through the fluid flow line 22a to the control system 14 to each fluid flow line 22b and to the vehicle tire 20. The pressurized fluid may flow into each valve 18 through the corresponding first inlet/outlet port 60 and flow out of each valve 18 through the corresponding second inlet/outlet port 62 to allow the pressurized fluid to flow into each vehicle tire 20, which may cause inflation of each vehicle tire 20.

Controlling each valve 18 to open also allows each vehicle tire 20 to provide pressurized fluid through the corresponding fluid flow line 22b to the control system 14 where the pressurized fluid may be expelled through the corresponding vent valve 66. The pressurized fluid may flow into each valve 18 through the corresponding second inlet/outlet port 60, through the corresponding first inlet/outlet port 60, through the corresponding fluid flow line 22b, and through the corresponding fluid flow line 22e. From the corresponding fluid flow line 22e, the pressurized fluid may flow to the corresponding vent valve 66 and may be exhausted by the corresponding vent valve 66, which may cause deflation of the vehicle tire 20.

Each fluid flow line 22e may fluidly connect the corresponding vent valve 66 to each corresponding valve 18. For example, each fluid flow line 22e may fluidly connect to the corresponding fluid flow line 22d to fluidly connect to the outlet of the corresponding vent valve 66.

Each supply valve 64 may be in communication with the controller 16 and fluidly connected to the first inlet/outlet port 60 of the corresponding valve 18 via the corresponding fluid flow lines 22b, 22d. When the system reservoir 36 holds pressurized fluid the pressurized fluid may be provided to the first inlet/outlet port 60 when the corresponding supply valve 64 is open. Providing pressurized fluid to each first inlet/outlet port 60 allows the corresponding vehicle tire 20 to inflate when the valve 18 is in the open state. In an embodiment, more than four supply valves are provided. In another embodiment less than four supply valves are provided.

Each vent valve 66 may be in communication with the controller 16 and fluidly connected with the first inlet/outlet port 60 of the corresponding valve 18 via the corresponding fluid flow lines 22b, 22d, 22e. The controller 16 may open each vent valve 66 independently to fluidly connect the corresponding first inlet/outlet port 60 with ambient air. Connecting each first inlet/outlet port 60 with ambient air allows the corresponding vehicle tire 20 to deflate to ambient air when the corresponding valve 18 is in the open state. In an embodiment, more than four vent valves are provided. In another embodiment less than four vent valves are provided.

The supply pressure sensor 68 may be operably connected to each fluid flow line 22c, which may fluidly connect the outlet of the pressure source 12 and the inlet of each supply valve 66. The supply pressure sensor 68 may be in communication with the controller 16 to provide the controller 16 with a reading of the pressure of the pressurized fluid provided by the pressure source 12.

Each inflation/deflation pressure sensor 70 may be operably connected to the corresponding fluid flow line 22d, which may fluidly connect the corresponding first inlet/outlet port 60 with the corresponding supply valve 64 and the corresponding vent valve 66. The inflation/deflation pressure sensor 70 may be in communication with the controller 16 to provide the controller 16 with a reading of the pressure of fluid flowing between each supply valve 64 and the corresponding valve 18. In an embodiment, more than four inflation/deflation pressure sensors are provided. In another embodiment less than four inflation/deflation pressure sensors are provided.

When the controller opens each supply valve 64 and closes the corresponding vent valve 66, the pressurized fluid from the pressure source 12 may flow to the corresponding valve 18. Each supply pressure sensor 68 and the corresponding inflation/deflation pressure sensor 70 may provide the pressure readings to the controller 16. The pressure reading of each inflation/deflation pressure sensor 70 may rise to a level equal to the pressure reading of the corresponding supply pressure sensor 68. For example, when each valve 18 is open and the corresponding vehicle tire 20 is inflated to 20 pounds per square inch gage (psig), the pressure reading of the corresponding pressure sensor 68 and the corresponding inflation/deflation pressure sensor 70 may be 20 psig.

Alternatively, when each valve 18 is closed and the corresponding vehicle tire 20 is inflated to 15 psig, the pressure reading of the corresponding pressure sensor 68 and the corresponding inflation/deflation pressure sensor 70 may be 20 psig. If a predetermined pressure level of each vehicle tire 20 is 20 psig, the corresponding valve 18 should be opened to allow each vehicle tire 20 to be inflated to 20 psig.

The controller 16 may be configured to determine whether the valve 18 should be opened and to determine whether the vehicle tire 20 should be inflated or deflated. For example, the controller 16 may have an input for a user to select the predetermined pressure level for each vehicle tire 20. The controller 16 may operate the pressure source 12 and the control system 14 to inflate or deflate each vehicle tire 20 to reach the selected predetermined pressure level.

To facilitate inflation and deflation of the vehicle tires 20, the controller 16 may determine the current state of the valves 18. For example, the controller 16 may determine whether each valve 18 is in the closed state, reset state, or the open state based on a history of pressurized fluid provided to the valve 18 at the direction of the controller 16. The controller 16 may store the history in the memory device.

The history stored may include the pressure level of pressurized fluid provided by the pressure source 12, the pressure level of pressurized fluid provided by each supply valve 64, and a time history of each pressure level. The history stored may also include a timeline of operation of the pressure source 12, the supply valve 64, and the vent valve 66.

For example, each valve 18 may be configured to have a reset pressure threshold at the corresponding first inlet/outlet port 60 that is greater than an opening pressure threshold at the first inlet/outlet port 60. The reset pressure (also known as an "initialized pressure") threshold may be greater than the vehicle tire 20 pressure to counter the vehicle tire 20 pressure. The reset pressure may counter any biasing force that biases the valve 18 in the closed state.

Each valve 18 may be configured to transition from the closed state to the reset state in a prescribed reset time period. The prescribed reset time period may be 0.5 seconds or less when pressurized fluid is provided to the first inlet/outlet port 60. The valve 18 may also be configured to transition from the reset state to the open state in a prescribed period of time reset. For example, the valve 18 may be configured to transition from the reset state to the open state in 0.5 seconds or less once pressure begins to lower at the first inlet/outlet port 60.

The valve 18 may be configured to transition from the open state to the closed state in a prescribed period of time open. The prescribed period of time open may be 30 seconds. In an embodiment, the prescribed period of time open is less than 30 seconds. In another embodiment, the prescribed period of time open is greater than 30 seconds.

The memory device of the controller 16 may include the configurations of each valve 18 and maintain a record of each in action made by the pressure source 12 or the control system 14. In an embodiment, the opening pressure threshold at each first inlet/outlet port may be greater than a maximum desired pressure level of fluid within the vehicle tire. The maximum desired pressure level may be a maximum manufacturer recommended pressure rating of the vehicle tire.

When resetting each valve 18, the controller 16 may keep a record of providing the pressurized fluid at or above the reset pressure threshold to the corresponding first inlet/outlet port 60 of each valve 18 for 0.5 seconds or longer. The controller 16 may determine that each valve 18 is in the reset position based on the known pressure provided to each first inlet/outlet port 60 for the prescribed period of time.

When opening the valve 18, the controller 16 may keep a record of lowering the pressure level of the pressurized fluid below the opening pressure threshold at each first inlet/outlet port 60 to allow the corresponding valve 18 to transition from the reset state to the open state. The controller 16 may adjust the fluid flow from the pressure source 12 to adjust the pressure of the pressurized fluid to a pressure below the opening pressure threshold to transition the valve 18 into the open state. The controller 16 may adjust and/or maintain the fluid flow from the pressure source 12 to maintain the pressure of the pressurized fluid at a pressure below the opening pressure threshold to prevent the valve 18 from transitioning to the reset state from the open state.

The controller 16 may determine that each valve 18 is in the open state based on the known pressure at the corresponding inflation/deflation pressure sensor 70 and an amount of time lapsed since pressure level lowered below the opening pressure threshold. Once opened, each valve 18 may close after the prescribed period of time open. The controller 16 may determine whether each valve 18 has closed based on the amount of time lapsed since opening each valve 18 and the pressure values provided by the corresponding inflation/deflation pressure sensor 70 over time.

The controller 16 may determine the pressure level of the fluid within the vehicle tire 20 based on the pressure values provided by the supply pressure sensor 68 and the inflation/deflation pressure sensor 70 over time in relation to the states of the pressure source 12, the supply valve 64, and the vent valve 66 over time.

Once the pressure level within the vehicle tire 20 is determined, the controller 16 may determine whether the valve 18 should be re-opened to either inflate or deflate the vehicle tire 20 based on a comparison of the selected pressure level for the vehicle tire 20 compared to the pressure level of the vehicle tire 20 determined by the controller 16.

If the determined pressure level is below the selected pressure level, the controller 16 may open the valve 18, the system reservoir 36, and the supply valve 64 to inflate the vehicle tire 20. While the valve 18 is in the open state, the controller 16 may adjust and/or maintain the fluid flow from the pressure source 12 to maintain the pressure of the pressurized fluid at a pressure below the opening pressure threshold and above the determined pressure of fluid within the vehicle tire 20 to inflate the vehicle tire 20.

If the determined pressure level is above the selected pressure level, the controller 16 may open the valve 18 and the corresponding vent valve 66 to deflate the corresponding vehicle tire 20. While the valve 18 is in the open state, the controller 16 may adjust and/or maintain the fluid flow from the pressure source 12 to maintain the pressure of the pressurized fluid at a pressure below the opening pressure threshold and below the determined pressure of fluid within the vehicle tire 20 to deflate the vehicle tire 20. The controller 16 may keep the valve 18 open or re-open the valve 18 until the pressure of the fluid inside the vehicle tire 20 reaches the selected pressure level. In an embodiment, the controller may keep the keep the valve open or re-open the valve until the pressure of the fluid inside the vehicle tire reaches ambient air pressure.

Fluid pressure levels may vary inside one of the vehicle tires 20 and at the corresponding inflation/deflation pressure sensor 70 as the corresponding valve 18 is repeatedly re-opened to deflate air inside the vehicle tire 20. A spike of pressure above the reset pressure threshold may occur each time the valve 18 is reset and a following drop in pressure may indicate the valve 18 is open. For example, after about 1 second a spike of pressure may reset the valve 18. After about 0.5 seconds, the pressure may drop to allow the valve 18 to open.

The air pressure within the vehicle tire 20 may drop as the air within the vehicle tire 20 vents from the vehicle tire 20. The air pressure measured by the inflation/deflation pressure sensor 70 may gradually drop with a reference pressure of 0.0 psig as the valve 18 transitions from the opened state to the closed state.

As the vehicle tire 20 deflates, the pressure of the air within the vehicle tire 20 and the pressure of the air measured by the inflation/deflation pressure sensor 70—while the valve 18 is open—may reduce each subsequent re-opening of the valve 18

The pressure measured by the inflation/deflation sensor 70 may correlate with the air pressure within the vehicle tire 20. Thus, a pressure sensor is not needed within the vehicle tire 20 to determine pressure of the air within the vehicle tire 20.

When the vehicle tire 20 is being inflated, the inflation/deflation sensor 70 would measure the same initial spike of air pressure. After lowering the air pressure to the opening pressure threshold, the air pressure measured by the inflation/deflation sensor 70 would increase at an increasing rate as valve 18 closes, until after the prescribed period of time open when the inflation/deflation sensor 70 reaches the pressure of the pressurized air provided by the pressure source 12 (FIG. 1). As the vehicle tire 20 is inflated the pressure within the vehicle tire 20 may gradually increase at a decreasing rate as the valve 18 closes.

Figure 4:
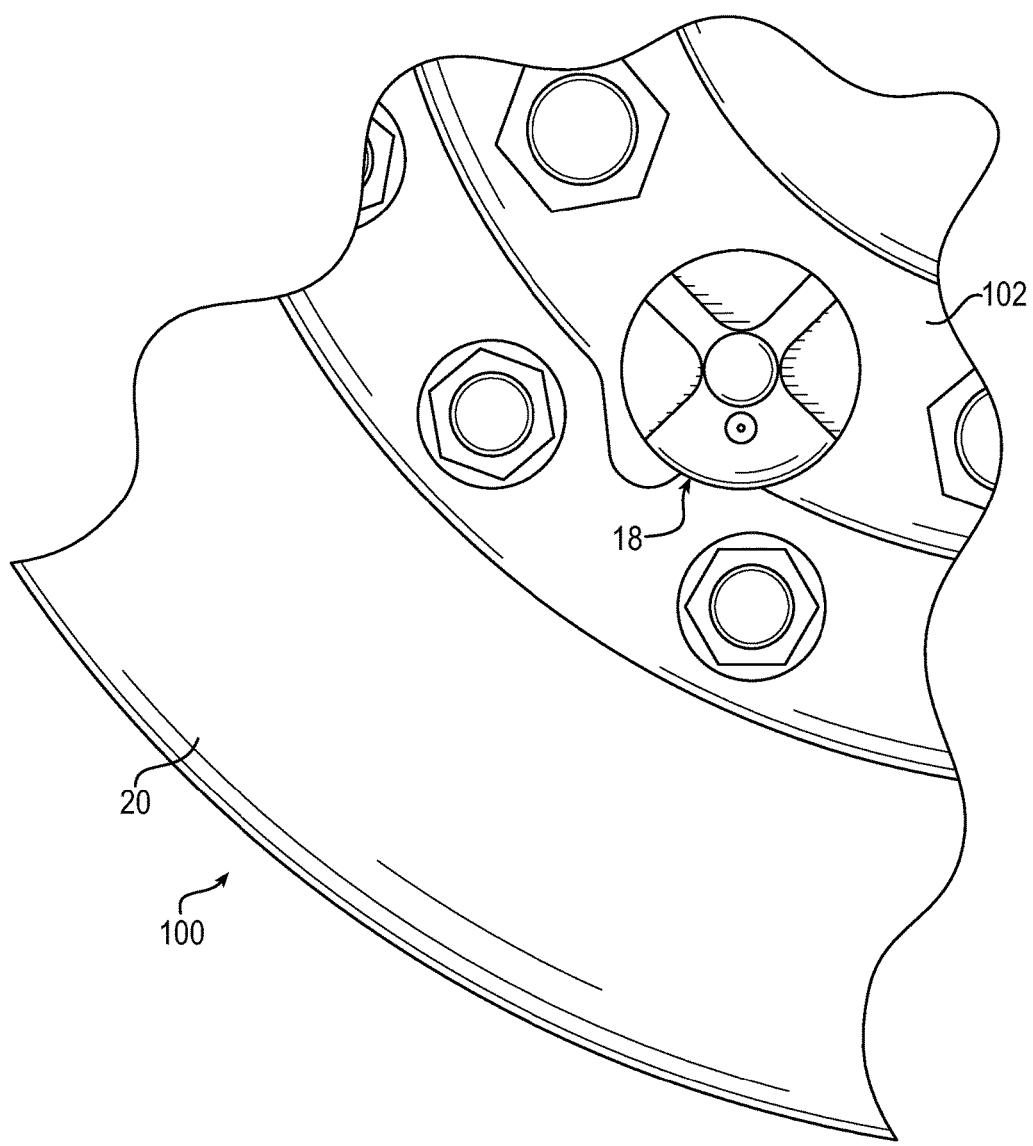
FIG. 4 is a top view of the valve of FIG. 1 assembled with a wheel assembly.

Turning to FIG. 4, a portion of a wheel assembly 100 may include a wheel 102, one of the vehicle tires 20, and the valve 18 assembled into the wheel 102. The valve 18 may be placed at a radially outward portion of the wheel 102 that is off-set from a wheel axis (not shown) that the wheel 102 rotates about. In an embodiment, the valve 18 is placed at another location of the wheel 102. In an embodiment, more than four vehicle tires are provided. In another embodiment less than four vehicle tires are provided.

Figure 5:
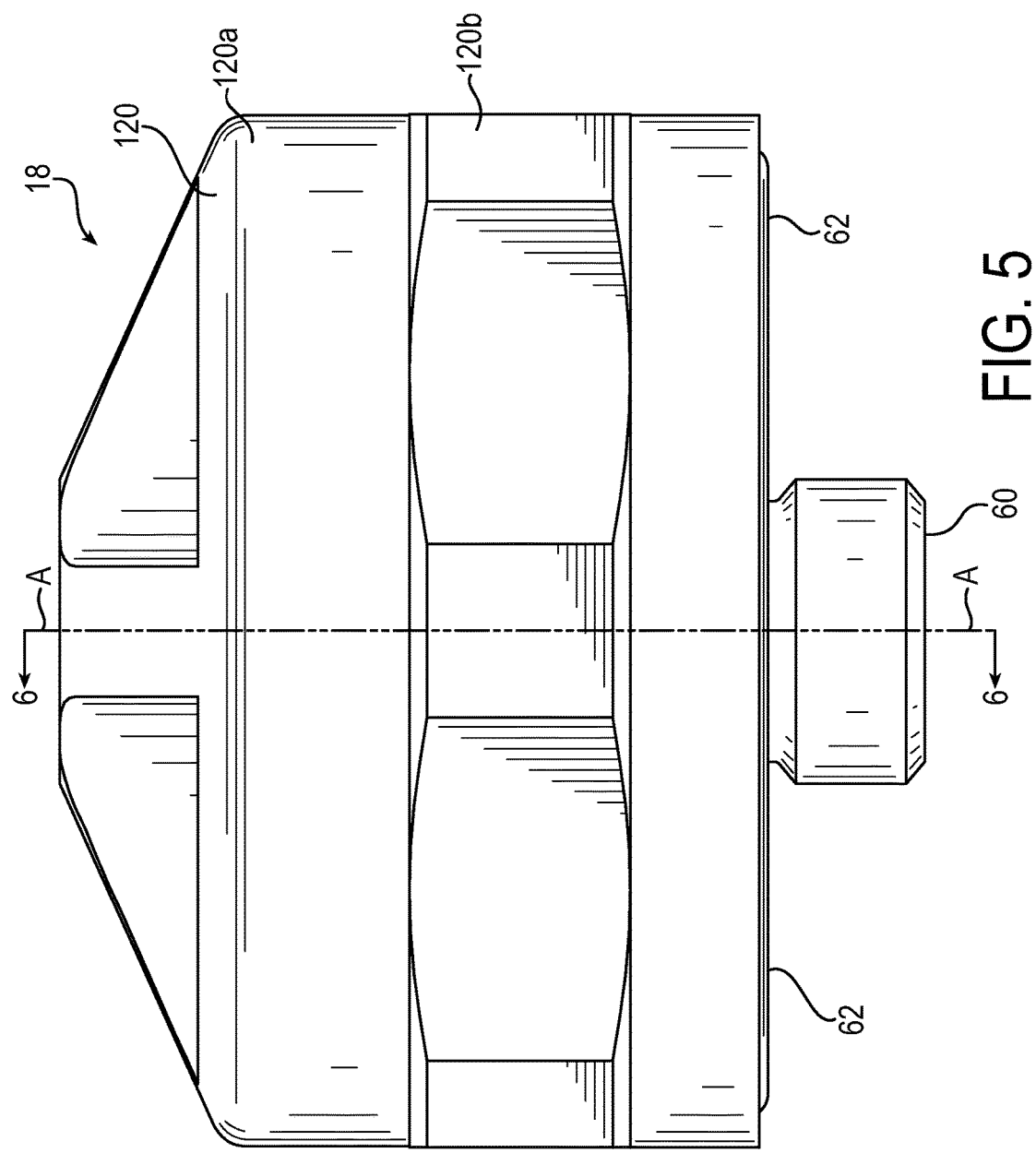
FIG. 5 is a side view of the valve of FIG. 1.

FIG. 5 is a side view of the valve 18 including a valve body 120. The valve body 120 may define the first inlet/outlet port 60 and define a second inlet/outlet port 62 that circumscribes the central axis A. The valve body 120 may be partially formed by two separate housing bodies 120a, 120b that sealingly connect to one another to form an outer housing of the valve body 120. The second inlet/outlet port 62 and the first inlet/outlet port 60 may be formed in the housing body 120b and may open toward a direction that faces the wheel 102 (FIG. 4).

The first inlet/outlet port 60 may circumscribe a central axis A. For example, the first inlet/outlet port 60 may be cylindrical for receiving a male connector (not shown) of a fluid flow line leading to the control system 14.

The second inlet/outlet port 62 may be radially outwardly spaced from the first inlet/outlet port 60 and may be fluidly connected to the vehicle tire 20. The second inlet/outlet port 62 may be cylindrical for receiving a male connector (not shown) of a fluid flow line leading to the vehicle tire 20.

Figure 6:
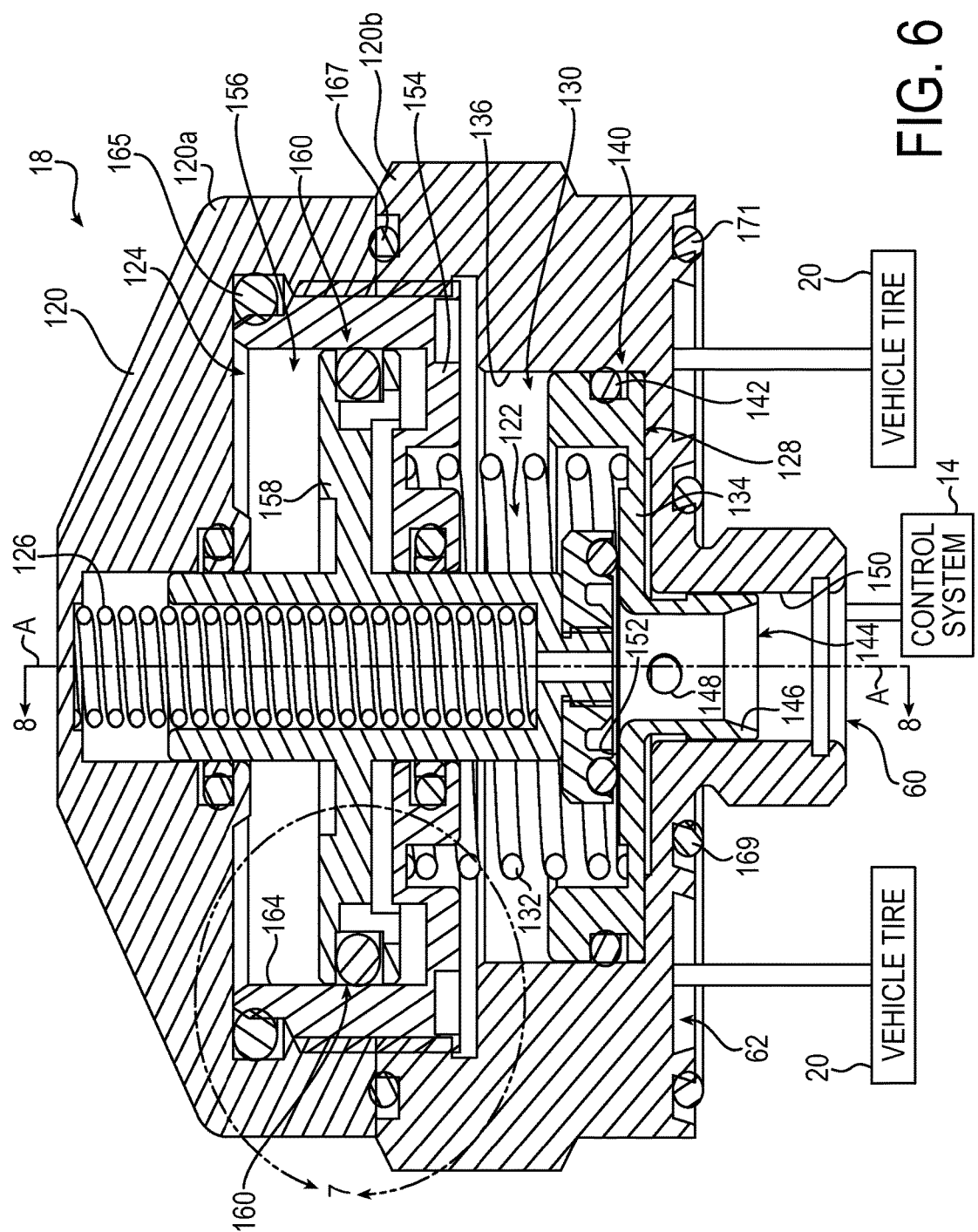
FIG. 6 is a cross-section view of the valve in a closed state taken along the line 7-7 of FIG. 5.

FIG. 6 is a cross-section view of the valve 18. The valve 18 may include a valve member 122, a damper 124 operably connected to the valve member 122, a timing resilient member 126, a reset member 128 moveable within a primary chamber 130 formed by the valve body 120, and a reset resilient member 132 for biasing the reset member 128.

The reset member 128 may include a reset piston 134. The reset piston 134 may have a radially outer profile perpendicular to the central axis A that is the same as a radially inner profile of an inner surface 136 of the valve body 120 to allow the reset piston 134 to move axially along the inner surface 136 within the primary chamber 130. The reset piston 134 may be cylindrical and may have a circular radially outer profile that matches the radially inner profile of the inner surface 136.

The reset piston 134 may include a radially outwardly facing groove 140 for securing a reset sealing member 142. The reset sealing member 142 may seal against the reset piston 134 and the inner surface 136 to prevent fluid flow between the inner surface 136 and the piston 134 when the piston 134 is stationary or moving.

The reset piston 134 may include a flow passage 144 for allowing fluid to flow between the first inlet/outlet port 60 and the second inlet/outlet port 62. The flow passage 144 may be at least partially formed by a cylindrical neck 146 of the reset piston 134.

The cylindrical neck 146 may extend axially away from the valve member 122. The cylindrical neck 146 may include a radial passage 148 for allowing fluid flow therethrough. The radial passage 148 may be axially offset from an axial end of the cylindrical neck 146 that may engage an inner surface 150 of the valve body 120.

The flow passage 144 may extend away from a seat 152 of the reset piston 134. The seat 152 may receive an axial end of the valve member 122 to fluidly disconnect the first inlet/outlet port 60 from the second inlet/outlet port 62.

Figure 10:
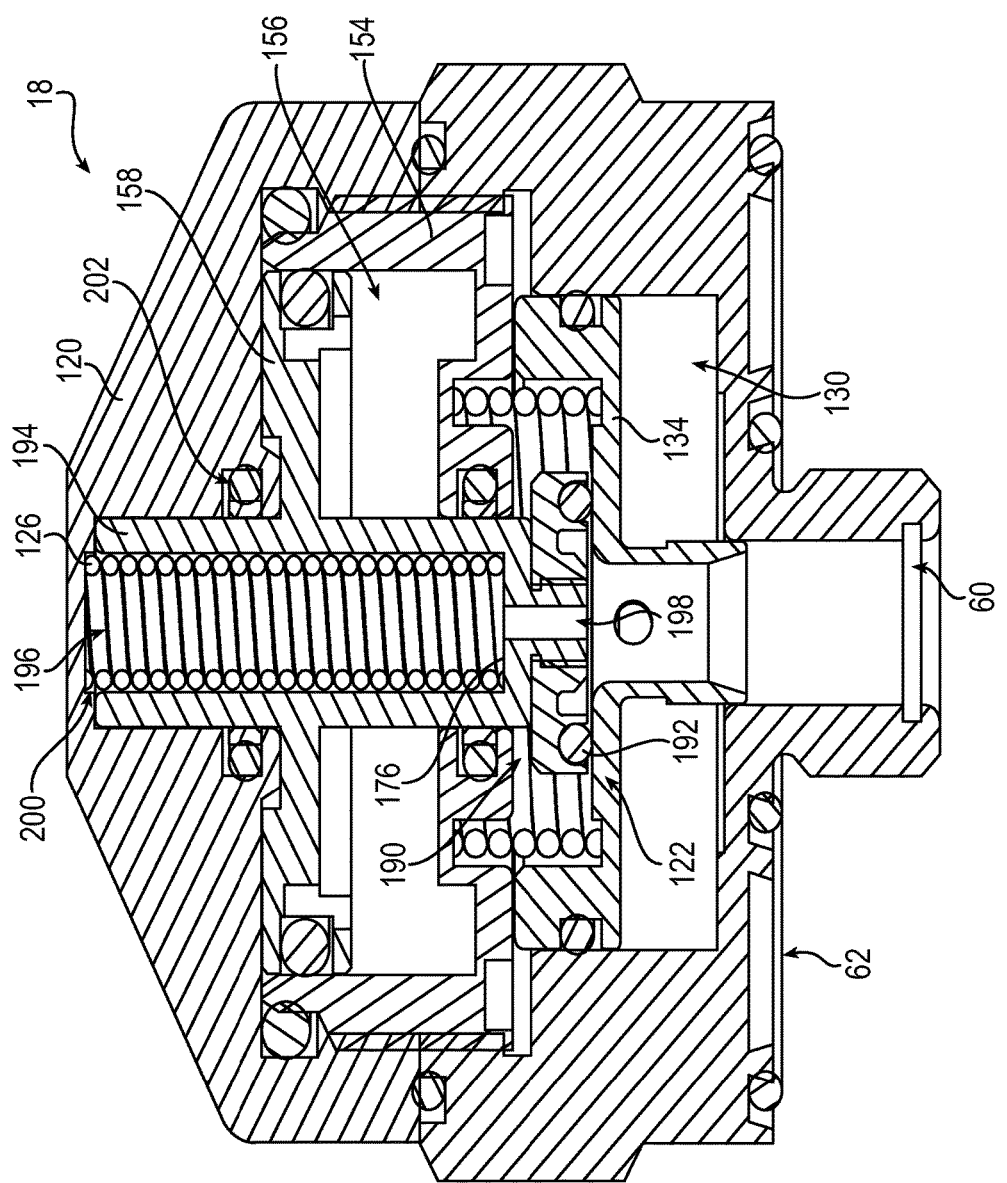
FIG. 10 is a cross-section view of the valve in a reset state taken along the line 6-6 of FIG. 5.

The reset piston 134 may be axially moveable within the primary chamber 130 to move from an open position to a reset position. The reset piston 134 is illustrated in the open position in FIG. 6 (FIG. 10 illustrates the reset position). The reset piston 134 may be axially disposed in a first portion of the primary chamber 130 when the reset piston 134 is in the open position. The valve 18 may be closed when the reset piston 134 is in the open position within the first portion of the primary chamber 130 while the valve member 122 is in a closed position abutting the reset piston 134 within the primary chamber 130.

The reset piston 134 may be moveable to the reset position and back to the open position. The reset resilient member 132 may bias the reset member 128 toward the open position. Biasing the reset member 128 allows the reset piston 134 to quickly return to the open position from the reset position when the pressurized fluid provided to the first inlet/outlet port 60 is at or below the opening pressure threshold.

The reset resilient member 132 may bias the reset piston 134 in a first axial direction extending from the second portion of the primary chamber 130 to the first portion of the primary chamber 130. The reset resilient member 132 may be any type of resilient member. For example, the reset resilient member 132 may be a spring, such as a metal spring.

The reset resilient member 132 may extend from an axially intermediate portion 154 of the valve body 120 to an axially facing surface of the reset piston 134. The axially facing surface may face in a second axial direction opposite the first axial direction.

The reset resilient member 132 may also circumscribe at least a portion of the timing resilient member 126. For example, the resilient member 132 may be entirely radially outward of the valve member 122 to prevent the resilient member 132 from interfering with movement of the valve member 122.

The reset piston 134 may be axially disposed in a second portion of the primary chamber 130 when the reset piston 134 is in the reset position. The second portion of the primary chamber 130 may be formed at an axially opposite end of the primary chamber 130 as the first portion of the primary chamber. When the valve member 122 is in a closed position, the reset piston 134 may move the valve member 122 to an open position in the second portion of the primary chamber 130 when the reset piston 134 moves from the open position to the reset position. For example, when the valve 18 is closed the reset piston 134 may be in the open position and the valve member 122 may be in the closed position. Providing pressurized fluid at or above the reset pressure threshold may cause the reset piston 134 to move from the open position to the reset position. While moving, the reset piston 134 may move the valve member 122 to the open position to place the valve 18 in the reset state.

Figure 11:
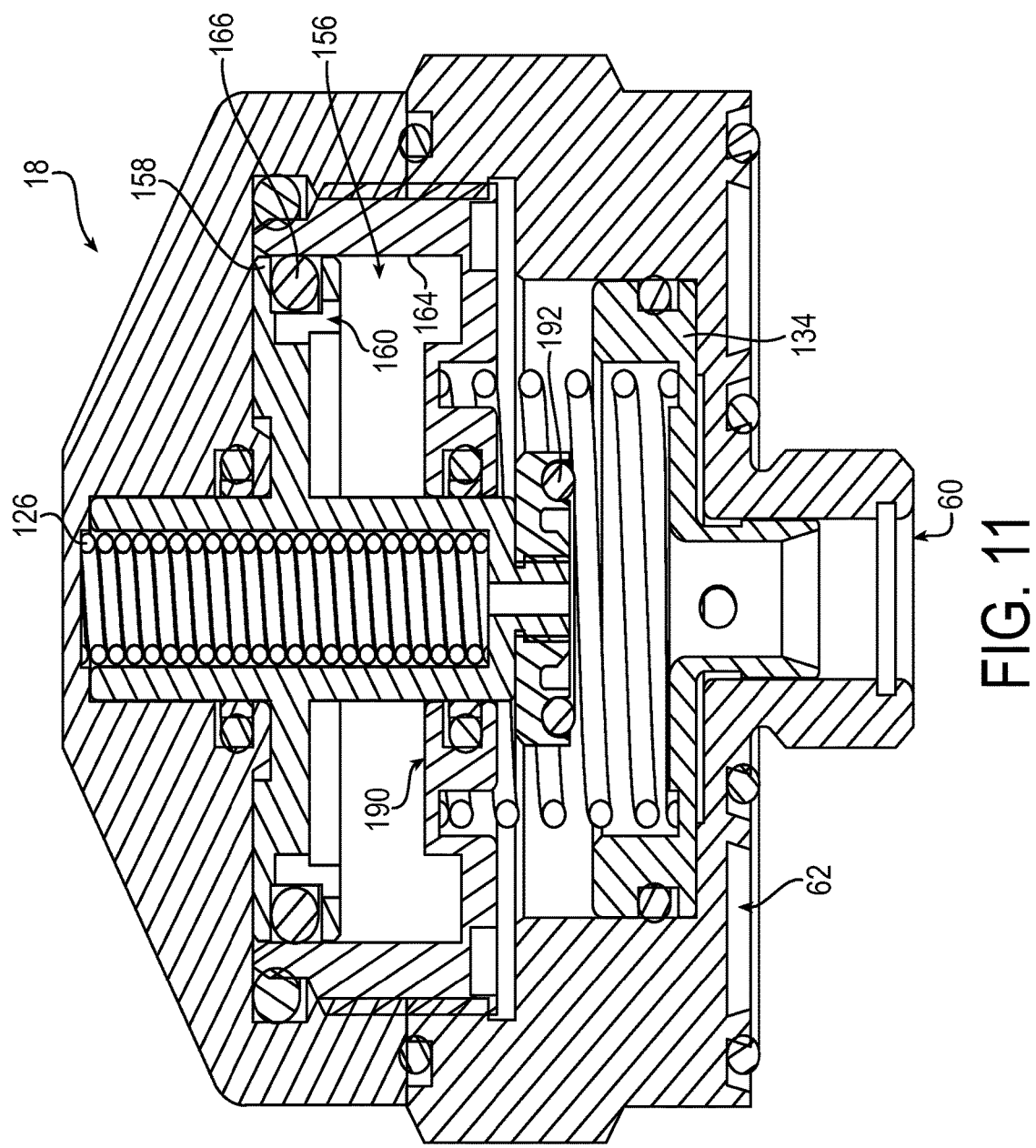
FIG. 11 is a cross-section view of the valve in an open state taken along the line 6-6 of FIG. 5.

The valve member 122 may be within the valve body 120 for fluidly disconnecting the first inlet/outlet port 60 and the second inlet/outlet port 62. The valve member 122 is illustrated in the closed position in FIG. 6 (FIGS. 10 and 11 illustrate the open position of the valve member 122) and may be moveable from the closed position to the open position. The damper 124 may dampen movement of the valve member 122 from the open position to the closed position. Dampening movement of the valve member 122 from the open position to the closed position allows the valve 18 to remain in the open state for the prescribed period of time open.

The damper 124 may include a timing chamber 156, a timing piston 158 moveable within the timing chamber 156, a check valve 160 for creating a pressure differential within the timing chamber 156, and a restrictive orifice 162 (shown in FIGS. 8 and 9) for delaying pressure equalization within the timing chamber 156. The timing chamber 156 may be formed by an inner surface 164 of the intermediate portion 154 that circumscribes the central axis A and an axially facing surface of the valve body 18. The timing chamber 156 may be filled with a fluid, such as air.

The timing piston 158 may be moveable by a reset force from an initial position at a first portion of the timing chamber 156 to a reset position (as shown in FIGS. 10 and 11) at a second portion of the timing chamber 156. The timing piston 158 may have a radially outer profile perpendicular to the central axis A that is the same as a radially inner profile of the inner surface 164 of the intermediate portion 154 to allow the timing piston 158 to move axially along the inner surface 164 within the timing chamber 156. The timing piston 158 may be cylindrical and may have a circular radially outer profile that matches the radially inner profile of the inner surface 164.

The axially intermediate portion 154 may be axially fixed to the housing bodies 120a, 120b to form an end of the primary chamber 130 axially opposite the first inlet/outlet port 60. For example, the axially intermediate portion 154 may have outer threads to threadingly attach to inner threads of the housing bodies 120a, 120b.

The valve 18 may include seals 165, 167, 169, 171. Each seal 165, 167, 169, 171 may be any suitable seal, such as an o-ring. The seal 165 may be radially disposed between the intermediate body 154 and the housing body 120a to prevent fluid flow between the intermediate portion 154 and the housing body 120a.

The seal 167 may be axially disposed between the radially outer surfaces of the housing bodies 120a, 120b to prevent fluid flow therebetween.

The seal 169 may be disposed in an axially facing groove of the housing body 120b circumscribing the central axis A radially between the first inlet/outlet port 60 and the second inlet/outlet port 62. When assembled into the vehicle wheel 102, the seal 169 may seal against the housing body 120b and the vehicle wheel 102 to prevent fluid from flowing outside of the housing body 120b between the first inlet/outlet port 60 and the second inlet/outlet port 62.

The seal 171 may be disposed in an axially facing groove of the housing body 120b circumscribing the central axis A radially outward of the second inlet/outlet port 62. When assembled into the vehicle wheel 102 (FIG. 4), the seal 171 may seal against the housing body 120b and the vehicle wheel 102 to prevent fluid flowing radially outward from the second inlet/outlet port 62.

Figure 7:
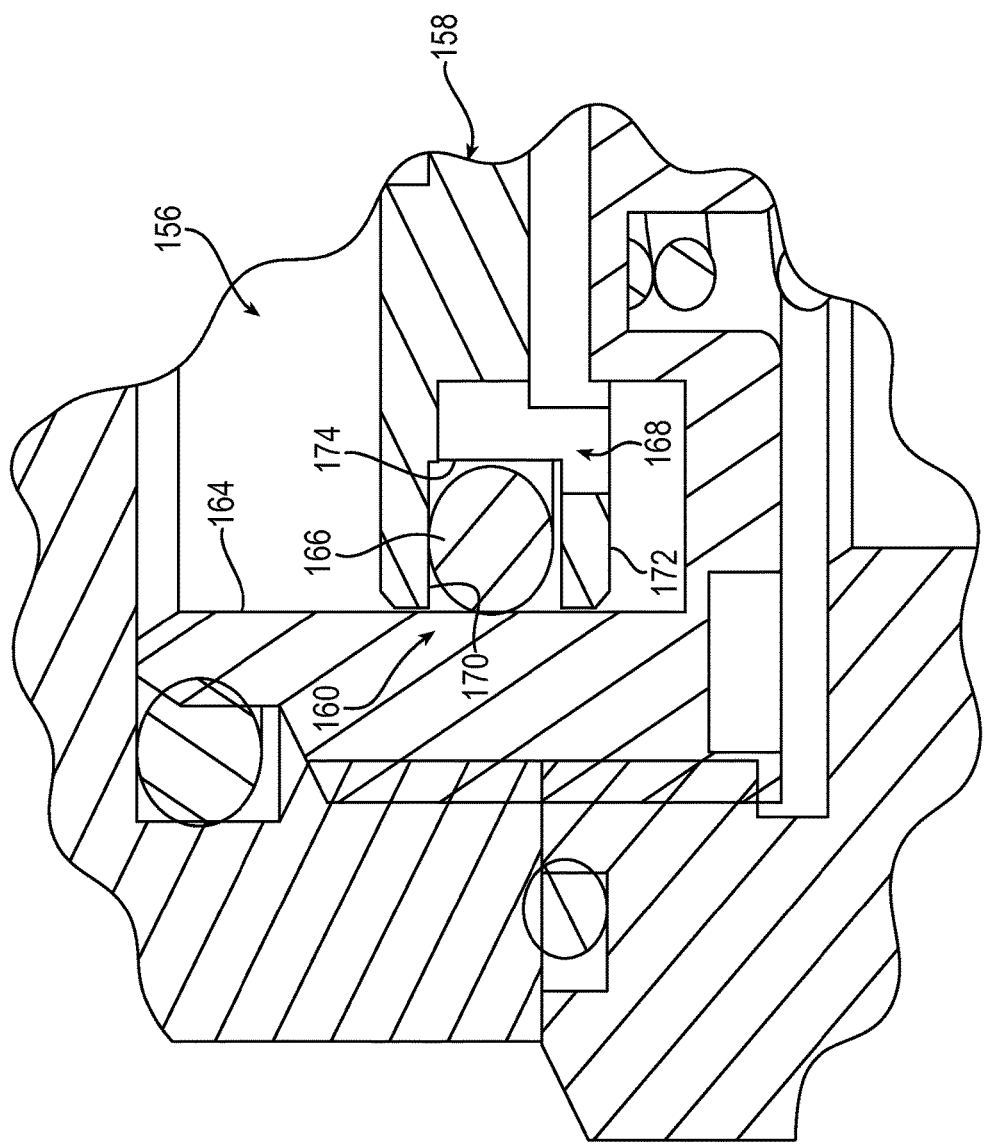
FIG. 7 is a partial view of the cross-section view of the valve of FIG. 6.

As best shown in FIG. 7, the check valve 160 may be disposed within the timing piston 158 to prevent fluid flow from the first portion of the timing chamber 156 to the second portion of the timing chamber, and to allow fluid flow from the second portion of the timing chamber 156 to the first portion of the timing chamber 156.

The check valve 160 may include a sealing member 166 and one or more fluid passages 168. The sealing member 166 may be disposed in a radially outward facing groove of the timing piston for abutting the inner surface 164 of the axially intermediate portion 154. Fluid flow through each fluid passage 168 may be prevented when the sealing member 166 is engaged with the inner surface 164 and the timing piston 158. For example, the sealing member 166 may be any suitable seal, such as an o-ring seal, and the o-ring seal may engage with the inner surface 164. The o-ring seal may also engage with an axial facing surface 170 of the timing piston 158 when the timing piston 158 moves from the reset position to the initial position.

Each fluid passage 168 may extend axially from an axially facing surface 172 of the timing piston 158 toward the sealing member 166. For example, each fluid passage 168 may extend to a radially outward facing surface 174 of the timing piston 158 to allow the sealing member 166 to recede radially inwardly into each fluid passage 168. In an embodiment, the fluid passage may extend axially through the timing piston and the sealing member may seal the fluid passage when the timing piston moves in the first axial direction.

The timing piston 158 may be moveable from the reset position toward the initial position with a closing force that allows the valve member 122 to close. The closing force may be greater than the reset force. For example, the closing force may be based on the fluid resistance against the timing piston 158 as the timing piston 158 moves from the reset position to the initial position. The fluid resistance may be much greater when moving the timing piston 158 from the reset position to the initial position compared to the reverse, because fluid pressure may slowly equalize throughout the timing chamber 156 as the timing piston 158 moves.

The reset force may be based on fluid resistance against the timing piston 158 as the timing piston 158 moves from the initial position to the reset position. The fluid resistance may be negligible when moving the timing piston 158 to the reset position compared to the reverse. The fluid pressure may equalize throughout the timing chamber 156 more quickly as the timing piston 158 moves to the reset position compared to moving to the initial position.

Figure 8:
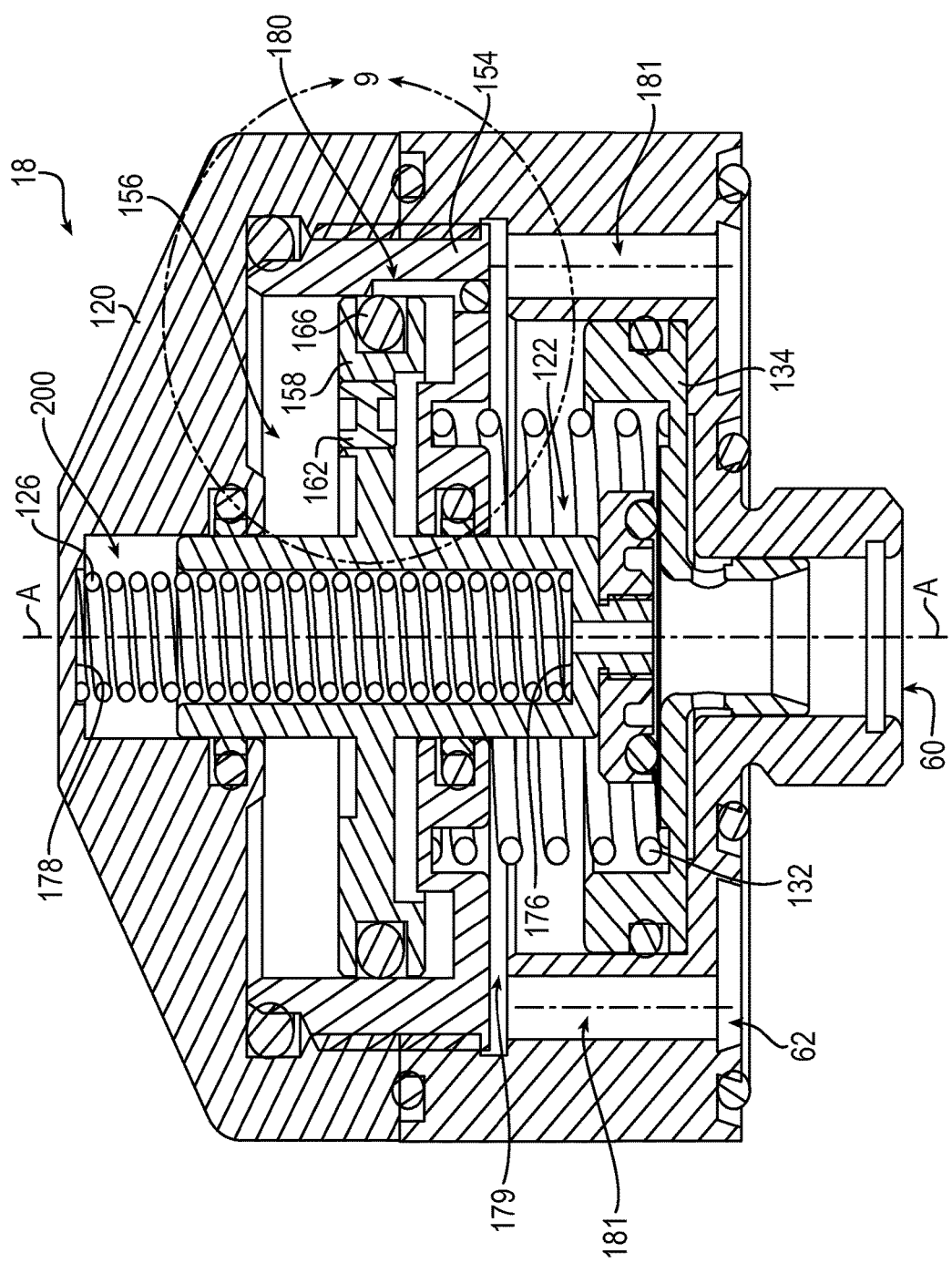
FIG. 8 is a cross-section view of the valve taken along the line 8-8 of FIG. 6 including a restrictive orifice.

Turning to FIG. 8, the timing resilient member 126 may bias the valve member 122, the timing piston 158, and the reset piston 134 in the first axial direction to bias the valve 18 in the closed state. The timing resilient member 126 may be any type of resilient member. For example, the timing resilient member 126 may be a spring, such as a metal spring.

The timing resilient member 126 may be at least partially disposed within the valve member 122. For example, the timing resilient member 126 may extend axially from a radially inwardly extending axially facing ledge 176 of the valve member 122 to an axially facing surface 178 of the valve body 120. The radially inwardly extending axially facing ledge 176 may face in the second axial direction opposite the axially facing surface 178.

The timing resilient member 126 may also circumscribe the central axis A at least partially within the timing piston 158 and/or the valve member 122. For example, the timing resilient member 126 may be entirely radially inward of the axially intermediate portion 154, of the reset resilient member 132, and of the timing piston 158.

The timing resilient member 126 may move the timing piston 158 from the reset position to the initial position. When moving the timing piston 158 from the reset position to the initial position fluid may be forced through the restrictive orifice 162 until the timing piston 158 approaches the first portion of the timing chamber 156.

The restrictive orifice 162 may restrict fluid flow from the first portion of the timing chamber 156 to the second portion of the timing chamber 156 to delay pressure equalization between the first portion and the second portion.

The restrictive orifice 162 may be disposed within the timing piston 158 or may form a portion of the timing piston 158. For example, the restrictive orifice 162 may be a foraminous portion of the timing piston 158. The foraminous portion may be formed by laser drilling one or more microscopic axial through passages for restricting fluid flow through the timing piston 158. In an embodiment, the restrictive orifice is an axially extending flow passage or a plurality of axially extending flow passages that restrict fluid flow.

The valve body 120 may include a radially outwardly extending passage 179 and one or more axially extending fluid passages 181 that may fluidly connect the second inlet/outlet port 62 to the radially outwardly extending passage 179. The radially outwardly extending passage 179 may be axially spaced from the first portion of the primary chamber 130 to allow fluid flow through the radially outwardly extending passage 179 when the reset piston 134 is in the open position. Axially spacing the radially outwardly extending passage 179 allows the reset piston 134 to prevent fluid flow through the radially outwardly extending passage 179 when the reset piston is in the reset position.

The radially outwardly extending passage 179 may have a cross-sectional area that have a fluid volume flow rate capacity that is equal to or greater than a fluid volume flow rate capacity of the axially extending fluid passage 181.

The valve 18 may include a quick close port 180 to reduce a fluid pressure differential between the first portion and the second portion of the timing chamber 158 as the timing piston 158 reaches an end of its stroke while moving from the reset position to the initial position. The quick close port 180 may fluidly connect the first portion to the second portion of the timing chamber 158. For example, the quick close port 180 may allow fluid to flow in the second axial direction from the first portion of the timing chamber to the second portion of the timing chamber.

Figure 9:
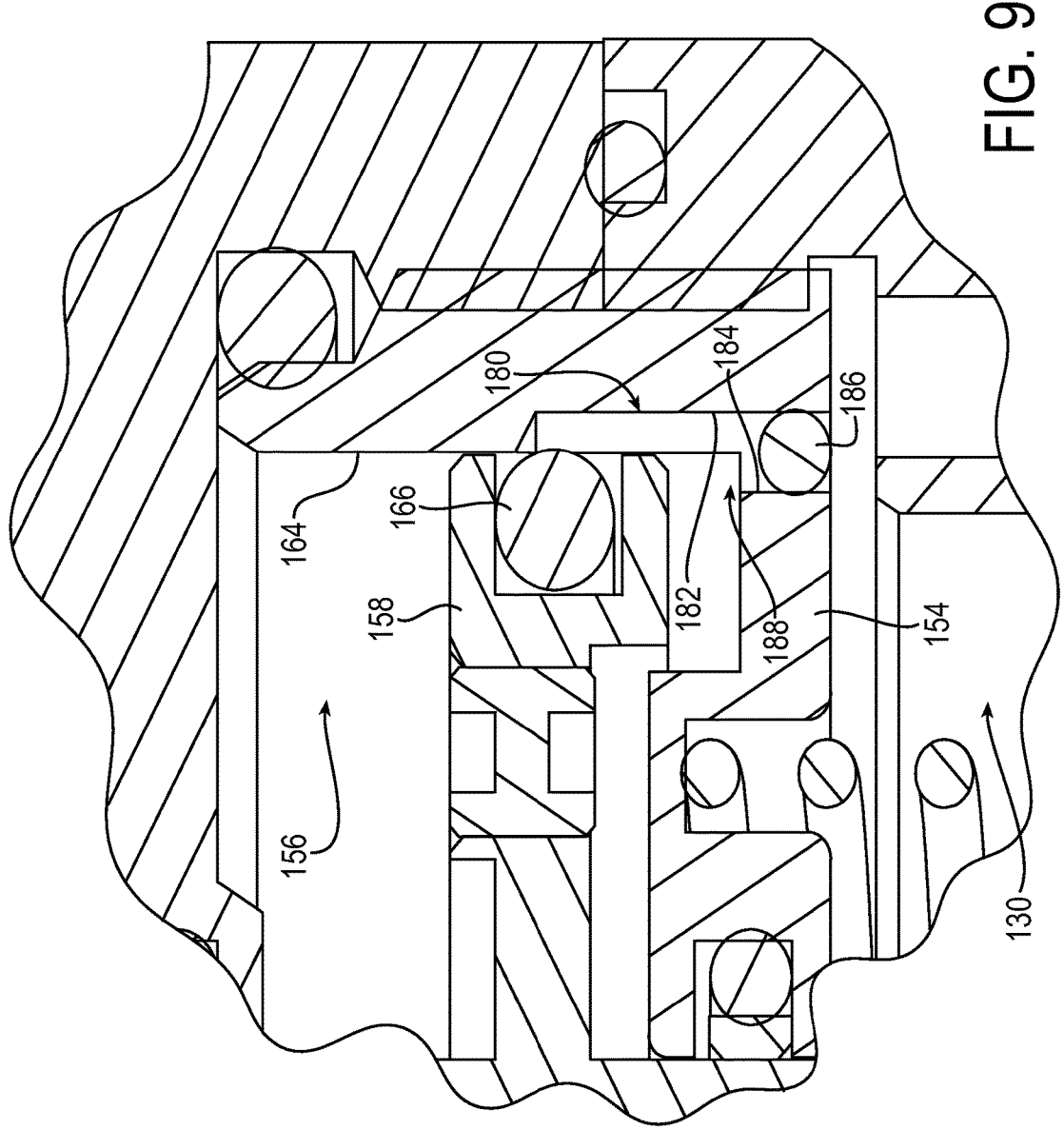
FIG. 9 is a partial view of the cross-section view of the valve of FIG. 8 including a quick close port.

As best shown in FIG. 9, the quick close port 180 may include a radially outwardly recessed portion 182 of the axially intermediate portion 154, a radially inwardly recessed portion 184 of the axially intermediate portion 154, and a sealing member 186. The radially outwardly recessed portion 182 may extend in the second axial direction from an axial end 188 of the first portion of the timing chamber 158.

The radially outwardly recessed portion 182 may extend in the second axial direction from the axial end 188 to allow fluid to flow through the radially outwardly recessed portion 182 past the timing piston 158 as the timing piston 158 is anywhere from 5% to 20% away from the end of its stroke in the first axial direction. For example, the axial length of the radially outwardly recessed portion 182 may be configured to allow fluid to flow through the radially outwardly recessed portion 182 past the timing piston 158 when the timing piston 158 has reached an axial position that would indicate 10% of time remaining for the timing piston 158 to reach the end of its stroke without the quick close port 180.

The radially inwardly recessed portion 184 may be recessed in the first axial direction and define at least a portion of the timing chamber. The sealing member 186 may be disposed at the axial end 188 between the radially outwardly recessed portion 182 and the radially inwardly recessed portion 184 to fluidly seal the timing chamber 156. Fluidly sealing the timing chamber 156 fluidly disconnects the quick close port 180 from the primary chamber 130 from the second inlet/outlet port 62 (shown in FIG. 8) to allow fluid to flow through the primary chamber 130 without affecting operation of the timing piston 158 and the quick close port 180.

When the timing piston 158 moves from the reset position to the initial position, a radially outward portion of the sealing member 166 disengages from the inner surface 164 at the radially outwardly recessed portion 182 to allow fluid to flow through the radially outwardly recessed portion 182. Allowing fluid flow quickens pressure equalization between the first portion and the second portion of the timing chamber 156 to reduce resistance to movement of the timing piston in the first axial direction.

Turning to FIG. 10, the valve 18 is illustrated in the reset state where the reset piston 134 has moved into the reset position to move the valve member 122 into the open position. Providing fluid with a fluid pressure at or above the reset pressure threshold at the first inlet/outlet port 60 may transition the valve member 122 and the reset piston 134 into the open position and the reset position, respectively.

The valve member 122 may include a poppet 190 and an end seal 192 at an axial end of the poppet 190 for sealing against the reset piston 134. In an embodiment, the valve member is another type of valve, for example a sliding valve.

The poppet 190 may extend axially along the central axis A through a central through hole in the intermediate portion 154. Extending through the intermediate portion 154 allows the poppet 190 to engage the reset piston 134 in the primary chamber 130 and to engage the timing piston 158 in the timing chamber 156.

The poppet 190 may be axially fixed to the timing piston 158. For example, the timing piston 158 and a body 194 of the poppet 190 may be formed in one-piece to allow the poppet 190 to be moveable with the timing piston 158.

The body 194 may define a moveable chamber 196 for housing a portion of the timing resilient member 126. The body 194 may also form the radially inwardly extending axially facing ledge 176 for abutting the timing resilient member 126. For example, the body 194 and the radially inwardly extending axially facing ledge 176 may circumscribe the central axis A.

The body 194 may include a flow passage 198 that is fluidly connected to a variable volume chamber 200 (shown best in FIG. 8) through the moveable chamber 196. The flow passage 198 may extend from an axial end of the poppet 190 that is engageable with the reset piston 134 to the moveable chamber 196.

The variable volume chamber 200 and the moveable chamber 196 may be fluidly disconnected from the timing chamber 156 by a seal 202 that engages with the body 194 and the valve body 120. For example, the seal 202 may be axially spaced from the timing piston 158 in the second axial direction to engage a radially outward facing surface of the body 194 at a location between the timing piston 158 and variable volume chamber 200.

The variable volume chamber 200 may have a minimum volume when the poppet 190 is in the open position. The variable volume chamber 200 may have a maximum volume that is larger than the minimum volume when the poppet 190 is in the closed position (shown in FIG. 8). The volume of the variable chamber 200 may reduce as the poppet 190 moves from the closed position to the open position.

Fluid contained within the variable chamber 200 and the moveable chamber 196 may flow through the flow passage 198. Fluid flowing through the flow passage 198 may flow to the primary chamber 130 to prevent fluid pressure build-up that may resist opening of the poppet 190.

The end seal 192 may be an axially facing seal, such as an o-ring, that is engageable with the reset piston 134 to seal against the reset piston 134. When engaged, the seal 192 and/or a radially outward extending flange of the poppet 190 may abut an axial face of the reset piston 134 to prevent fluid flow therebetween. Preventing fluid flow between the reset piston 134 and the seal 192 may fluidly disconnect the first inlet/outlet port 60 and the second inlet/outlet port 62. For example, the fluid flow from the first inlet/outlet port 60 through the primary chamber 130 to either second inlet/outlet port 62 may be prevented.

Turning to FIG. 11, the valve 18 is illustrated in the open state. When the valve 18 is in the reset state, reducing the fluid pressure at or below the opening pressure threshold at the first inlet/outlet port 60 may transition the valve 18 to the open state.

When the valve 18 is in the open state, the seal 192 may be axially spaced from the reset piston 134 to allow fluid to flow between the poppet 190 and the reset piston 134. The poppet 190 may be in the open position and the reset piston 134 may be in the open position to allow fluid to flow from the first inlet/outlet port 60 to each second inlet/outlet port 62.

The timing piston 158 may dampen movement of the poppet 190 from the open position to the closed position. For example, the timing resilient member 126 may bias the poppet 190 to close while the fluid in the first portion of the timing chamber 156 increases in pressure relative to the fluid in the second portion of the timing chamber 156. The fluid in the first portion may force the check valve 160 to prevent fluid flow.

The increased pressure of the fluid in the first portion may cause the sealing member 166 to seal against the inner surface 164 to prevent fluid flow therebetween. Fluid from the first portion of the timing chamber 156 may only be able to equalize pressure with the fluid in the second portion of the timing chamber 156 by flowing through the restrictive orifice 162 (shown in FIG. 8) until the timing piston 158 reaches the quick close port 180 (shown in FIG. 8). Restricting the fluid flow may delay closure of the poppet 190 to allow fluid to flow through the primary chamber 130 between the first inlet/outlet port 60 and each second inlet/outlet port 62.

The delayed closure may allow the poppet 190 to remain axially spaced from the reset piston 134 for the prescribed period of time open. The prescribed period of time open may be anywhere from 10-60 seconds preferably 20-40 seconds, and more preferably 30 seconds. In an embodiment, the prescribed period of time open may be based on a size of the vehicle tire, a desired pressure of the vehicle tire, and desired deflation rates of the vehicle tire.

Pressure at the second inlet/outlet port 62 may be reduced below the opening pressure threshold. For example, the pressure provided to the first inlet/outlet port 60 may lowered, or completely removed, and the poppet 190 may remain axially spaced apart from the reset piston 134 for the prescribed period of time open. While the popper 190 is axially spaced from the reset piston 134, fluid may flow from the second inlet/outlet port 62 to the first inlet/outlet port 60.

The fluid pressure at the second inlet/outlet port 62 may reduce toward ambient pressure by expelling fluid from the second inlet/outlet port 62 to the first inlet/outlet port 60. For example, the first inlet/outlet port 60 may be fluidly connected to ambient air, such as when the corresponding vent valve 66 (FIG. 1) is open.

The poppet 190 may remain axially spaced from the reset piston 134 during the prescribed period of time open when the pressure at the first inlet/outlet port 60 is equal to ambient pressure. The fluid pressure at the second inlet/outlet port 62 may be reduced to ambient pressure when the first inlet/outlet port 60 is at ambient pressure and the valve 18 is opened. For example, ambient pressure may be 0.0 psig and the poppet 190 may remain axially spaced from the reset piston 158 for the prescribed period of time open.

Figure 12:
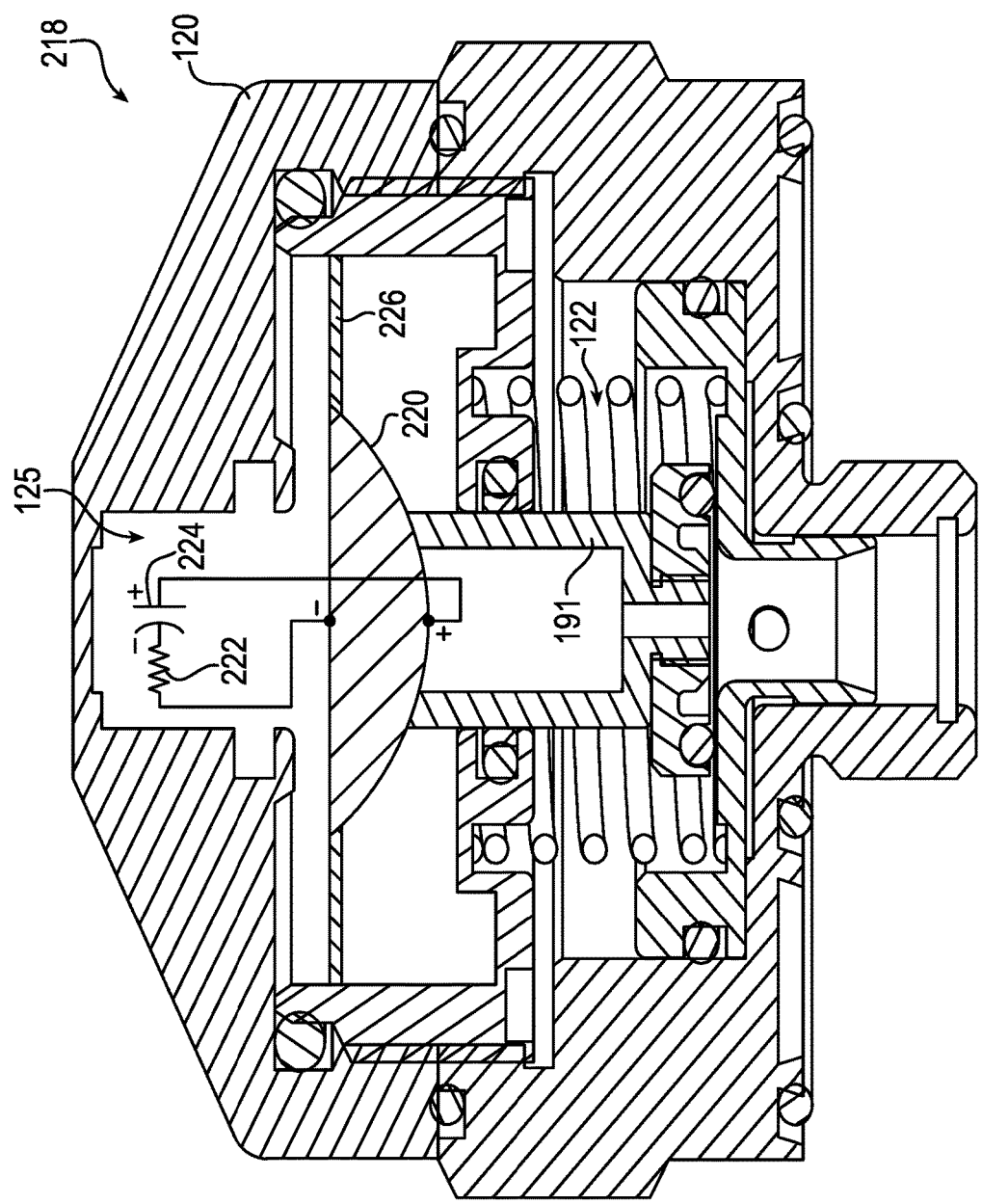
FIG. 12 is a cross-section view of a valve of another embodiment in a closed state.

Turning now to FIG. 12, an exemplary embodiment of the valve is shown at 218. The valve 218 is substantially the same as the above-referenced valve 18. In addition, the foregoing description of the valve 18 is equally applicable to the valve 218 except as noted below. Moreover, it will be appreciated upon reading and understanding the specification that aspects of the valves may be substituted for one another or used in conjunction with one another where applicable.

The valve 218 may include a damper 125 that is operably coupled to a valve member 122 to dampen movement of a valve member 122 from an open position to a closed position.

The damper 125 may include a piezoelectric element 220, a resistor 222, and a capacitor 224.

The piezoelectric element 220 may be operatively connected to an end of a poppet 191. When the poppet 191 moves from the closed position to the open position the poppet 191 may deform the piezoelectric element to generate an electric charge. For example, the piezoelectric element 220 may have a convex portion that is engaged with the end of the poppet 191. A radially extending support member 226 may axially fix the piezoelectric element 220 to a valve body 120. When the poppet 191 opens the convex portion may compress to generate the electric charge for the capacitor 226.

The capacitor may be operatively connected to the piezoelectric element 220 to receive electric current generated by the piezoelectric element 220 and to send electric current back to the piezoelectric element 220. For example, a negative terminal of the capacitor 224 may be electrically connected to a negative terminal of the piezoelectric element 220 and a positive terminal of the capacitor 224 may be electrically connected to a positive terminal of the piezoelectric element 220. The negative terminal of the capacitor 224 may be electrically connected to the negative terminal of the piezoelectric element 220 via the resistor 222.

The resistor 222 may be connected in series with the capacitor 224 and the piezoelectric element 220. For example, the resistor 222 may reduce electrical current flowing to or from the piezoelectric element 220.

When the piezoelectric element 220 is deformed to generate the charge, the current may flow through the resistor 222 to the capacitor 224 to charge the capacitor 226.

When the capacitor 224 discharges to the piezoelectric element 220, the resulting electrical current may flow through the resistor 222.

The resistor 222 may have a resistance to reduce the electrical current discharged from the capacitor 224 to delay the piezoelectric element 220 from resuming its original form, thereby dampening closure of the poppet 191, which may close the valve 218. For example, the resistor 222 may have a resistance based on a desired prescribed period of time open. Increasing the resistance of the resistor 222 may increase the prescribed period of time open. Decreasing the resistance of the resistor 222 may decrease the prescribed period of time open.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve for use in an inflation/deflation system, comprising:
 a valve body having a first inlet/outlet port fluidly connectable to a second inlet/outlet port;
 a valve member within the valve body for fluidly disconnecting the first inlet/outlet port and the second inlet/outlet port, the valve member being moveable from a first position to a second position; and
 a damper operably connected to the valve member to dampen movement of the valve member from the second position to the first position;
 wherein in a first state the first inlet/outlet port is fluidly disconnected from the second inlet/outlet port by the valve member;
 wherein the valve would transition to a second state when a fluid pressure at the first inlet/outlet port is at or above a prescribed pressure threshold, when in the second state the first inlet/outlet port would be fluidly disconnected from the second inlet/outlet port;
 wherein when the valve is in the second state, lowering the fluid pressure below the prescribed pressure threshold would cause the valve to transition from the second state to a third state; and
 wherein when in the third state the first inlet/outlet port would be fluidly connected to the second inlet/outlet port while the damper would dampen movement of the valve member from the second position to the first position to maintain the valve in the third state for a prescribed period of time.

2. The valve of claim 1, further comprising:
 the valve body forming a primary chamber, the primary chamber being fluidly connectable to the first inlet/outlet port and the second inlet/outlet port;
 the damper having a portion moveable from the first position to the second position by a first force, and moveable from the second position to the first position by a second force, wherein the first force is less than the second force;
 the valve member extending along a central axis, and moveable within the primary chamber;

a timing resilient member biasing the valve member in a first axial direction to bias the valve member in the first position;

a reset member moveable within the primary chamber to move the valve member from the first position to the second position;

wherein when the valve member abuts the reset member the first inlet/outlet port and the second inlet/outlet port are fluidly disconnected;

wherein in the first state, the valve member and the reset member abut one another within a first portion of the primary chamber to fluidly disconnect the first inlet/outlet port and the second inlet/outlet port;

wherein in the second state, the valve member and the reset member abut one another within a second portion of the primary chamber, the second portion of the primary chamber being axially spaced in a second axial direction opposite the first axial direction from the first portion of the primary chamber;

wherein in the third state, the valve member and the reset member are axially spaced from one another to allow fluid flow therebetween, thereby fluidly connecting the first inlet/outlet port and the second inlet/outlet port.

3. The valve of claim 2, further comprising:

wherein the damper includes a timing piston moveable within a timing chamber, wherein the timing piston is moveable from the first position in the timing chamber to the second position in the timing chamber by the first force, and moveable from the second position to the first position by the second force;

wherein the valve member includes a poppet extending along the central axis, the poppet being moveable with the timing piston, and moveable within the timing chamber and the primary chamber, wherein the timing chamber is fluidly disconnected from the primary chamber;

wherein the timing resilient member biases the poppet and the timing piston in the first axial direction extending from the timing chamber to the primary chamber;

wherein the reset member includes a reset piston moveable within the primary chamber, the reset piston having a flow passage, wherein when the poppet abuts the reset piston the flow passage is fluidly disconnected from the second inlet/outlet port;

wherein when the poppet abuts the reset piston the first inlet/outlet port and the second inlet/outlet port are fluidly disconnected;

wherein in the first state, the poppet and the reset piston abut one another within the first portion of the primary chamber to fluidly disconnect the first inlet/outlet port and the second inlet/outlet port;

wherein in the second state, the poppet and the reset piston abut one another within the second portion of the primary chamber;

wherein in the third state, the poppet and the reset piston are axially spaced from one another to allow fluid flow therebetween, thereby fluidly connecting the first inlet/outlet port and the second inlet/outlet port.

4. The valve of claim 2, wherein a reset piston includes a flow passage that extends away from a seat of the reset piston.

5. The valve of claim 2, wherein the valve member includes a flow passage fluidly connected to a variable volume chamber formed by the valve member and the valve body.

6. The valve of claim 2, wherein the valve further includes a reset resilient member that biases the reset member in the first axial direction.

7. The valve of claim 2, wherein the damper further comprises a timing piston, a check valve for preventing fluid flow from a first portion of a timing chamber to a second portion of the timing chamber, and for allowing fluid flow from the second portion of the timing chamber to the first portion of the timing chamber.

8. The valve of claim 2, further comprising a restrictive orifice for restricting fluid flow from a first portion of a timing chamber to a second portion of the timing chamber.

9. The valve of claim 2, further comprising a quick close port to reduce fluid pressure in a first portion of a timing chamber as a timing piston reaches an end of its stroke while moving in the first axial direction.

10. The valve of claim 2, wherein the damper further comprises a piezoelectric element that is operatively connected to the valve member to dampen closure of the valve member.

11. The valve of claim 10, wherein the damper further comprises a resistor and a capacitor, wherein the resistor is connected in series with the piezoelectric member and the capacitor.

12. The valve of claim 1, wherein the valve is open and remains open when the fluid pressure at the first inlet/outlet port is equal to ambient pressure.

13. The valve of claim 1, wherein when the valve is in the second state and fluid pressure is below the prescribed threshold at the first inlet/outlet port, the first inlet/outlet port and the second inlet/outlet port become fluidly connected such that fluid is flowable from the second inlet/outlet port to the first inlet/outlet port in the third state.

14. The valve of claim 13, wherein the valve is open and remains open for the prescribed period of time when an opening pressure below the prescribed threshold is provided to the first inlet/outlet port is reduced to 0.0 psig, thereby keeping the first inlet/outlet port and the second inlet/outlet port fluidly connected for the prescribed period of time without a control pressure.

15. A central inflation/deflation system for a vehicle, comprising:

the valve of claim 1;

a fluid reservoir fluidly connected to the second inlet/outlet port of the valve;

a control system fluidly connected to the first inlet/outlet port of the valve; and a pressure source with an outlet fluidly connected to an inlet of the control system.

16. The central inflation/deflation system of claim 15, wherein the fluid reservoir is a vehicle tire; and further comprising a controller for controlling the control system and the pressure source;

wherein the control system comprises:

a supply valve in communication with the controller and fluidly connected to the first inlet/outlet port of the valve, wherein an inlet of the supply valve is fluidly connected to the pressure source;

a vent valve in communication with the controller and fluidly connected with the first inlet/outlet port of the valve, wherein opening the vent valve fluidly connects the first inlet/outlet port with ambient air, thereby allowing the vehicle tire to deflate to ambient air when the valve is in the third state and the vent valve is open; and wherein the pressure source comprises:
- a fluid pump with an intake port for receiving ambient air;
- a cooler with an inlet fluidly connected to an outlet of the fluid pump;
- an air dryer with an inlet fluidly connected to an outlet of the cooler;
- a system reservoir with an inlet fluidly connected to an outlet of the air dryer, wherein the system reservoir has an outlet fluidly connected to the inlet of the supply valve, and wherein when the system reservoir holds pressurized fluid the pressurized fluid is provided to the first inlet/outlet port when the supply valve is open, thereby providing pressurized fluid from the system reservoir to the vehicle tire when the valve is in the third state and the supply valve is open.

17. The central inflation/deflation system of claim 16, wherein the controller is configured to maintain the pressure source in an open position and the supply valve in an open position to provide pressurized air at or above the prescribed pressure threshold to the first inlet/outlet port to transition the valve into the third state.

18. A method of operating a valve for use in an inflation/deflation system, comprising:
- providing the valve, the valve including a valve body having a first inlet/outlet port fluidly connectable to a second inlet/outlet port, a valve member within the valve body for fluidly disconnecting the first inlet/outlet port and the second inlet/outlet port, the valve member being moveable from a first position to a second position, and a damper operably connected to the valve member to dampen movement of the valve member from the second position to the first position, wherein in a first state the first inlet/outlet port is fluidly disconnected from the second inlet/outlet port by the valve member;
- providing fluid with a fluid pressure at or above a prescribed pressure threshold at the first inlet/outlet port;
- transitioning the valve to a second state based on the fluid pressure being at or above the prescribed pressure threshold, wherein in the second state the first inlet/outlet port is fluidly disconnected from the second inlet/outlet port;
- reducing the fluid pressure below the prescribed pressure threshold at the first inlet/outlet port; and
- transitioning the valve to a third state based on the fluid pressure being below the prescribed pressure threshold;
- dampening movement of the valve member from the second position to the first position with the damper to maintain the valve in the third state for a prescribed period of time, wherein in the third state the first inlet/outlet port is fluidly connected to the second inlet/outlet port.

19. The method of claim 18, wherein providing the fluid pressure at or above the first threshold resets a reset member in the valve.

20. The method of claim 18, further comprising reducing pressure at the second inlet/outlet port below the second pressure threshold by providing fluid flow from the second inlet/outlet port to the first inlet/outlet port when the valve is open.

* * * * *